Nov. 12, 1935.  E. F. PAWSAT  2,020,904
BICYCLE STAND
Filed Sept. 10, 1934
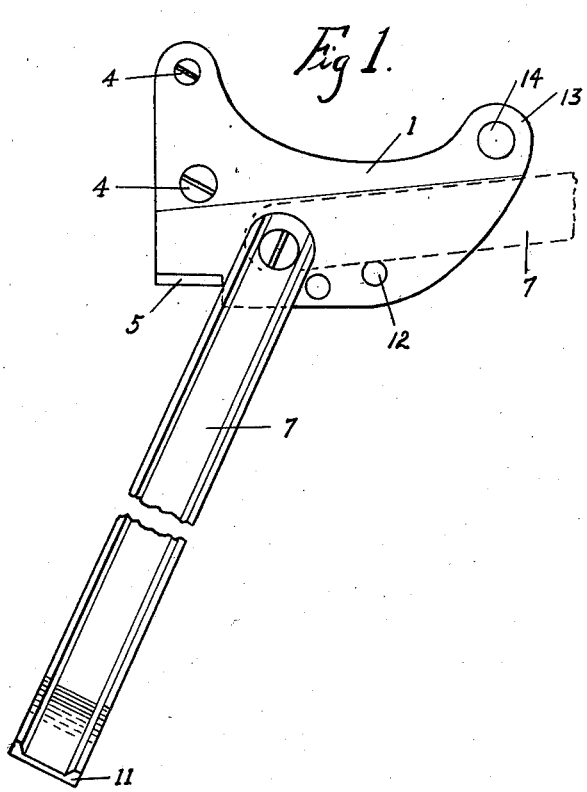
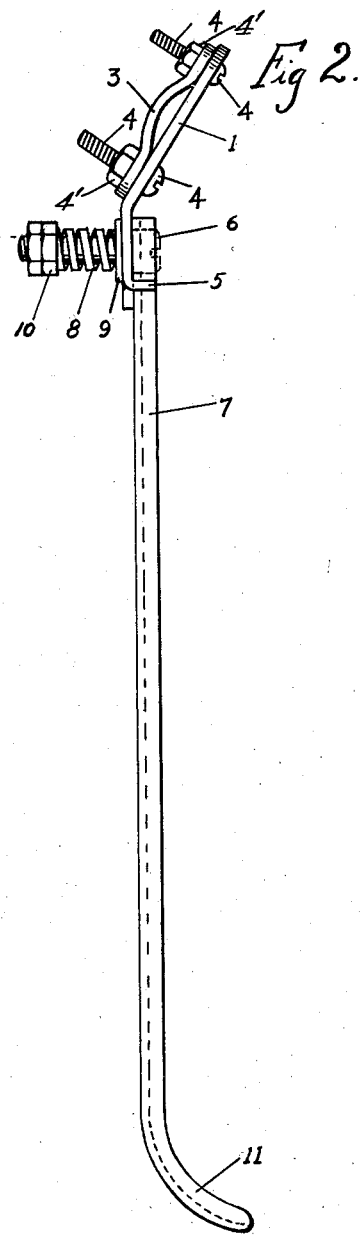
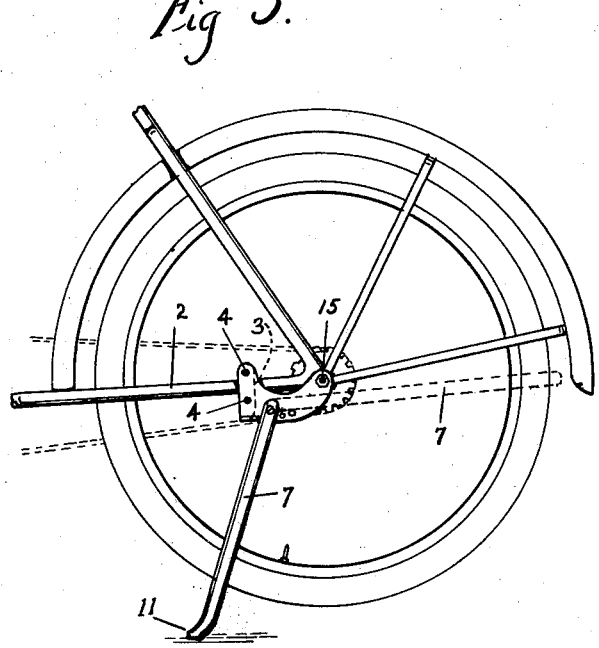
Inventor,
Ewald F. Pawsat,
By Arthur H. Ewald,
Attorney.

Patented Nov. 12, 1935

2,020,904

UNITED STATES PATENT OFFICE 2,020,904

BICYCLE STAND

Ewald F. Pawsat, Maysville, Ky., assignor to Wald Manufacturing Company, Incorporated, a corporation of Kentucky Application September 10, 1934, Serial No. 743,321

1 Claim. (Cl. 208—75)

My invention relates to stands for bicycles of the type which may be permanently secured to the bicycle.

The principal object of the present invention is to provide a simple and inexpensive device which may be permanently secured to a bicycle and which comprises a supporting member or arm of rigid and durable construction adapted to be moved either into supporting position or raised so as not to interfere with the operation of the vehicle.

Further objects of my invention will appear from the following detailed description thereof.

In the drawing:

Figure 1 is a side elevation of a stand constructed in accordance with this invention.

Figure 2 is a front elevation of said stand.

Figure 3 is an elevation of the rear portion of a bicycle with the stand attached thereto, the supporting member being shown in supporting position in full lines and in inoperative position in dotted lines.

My new stand consists of a plate or bracket 1 which is adapted to be secured to the horizontal frame member 2 of a bicycle by means of a clamping plate 3, bolts 4 and nuts 4'. The lower front edge of the plate 1 is bent outwardly to form a stop or detent 5. Pivotally secured to the plate 1 in back of the detent 5 by means of a bolt 6 is a support or standard 7. The pivotal connection of plate 1 and standard 7 are maintained in frictional tension by means of a coil spring 8 mounted around the bolt 6 between a washer 9 which abuts against plate 1 and a nut 10 which screws onto the bolt.

The standard 7 as illustrated in the drawing is of channeled construction for rigidity, but may be of any other construction suitable to the purpose. The lower end of the standard turns outwardly as shown at 11 to provide a suitable foot or base therefor.

The plate 1 is provided with a boss or spherical stud 12 the same being located to the rear of the pivotal mounting of standard 7 and slightly below same. The boss or stud 12 serves to hold the standard 7 in raised or inoperative position, as shown in broken lines in Figures 1 and 3. Movement of the standard into inoperative position over the stud 12 is accomplished against the compression of spring 8, which spring maintains the standard tightly against the surface of the plate 1 above the boss 12, said boss thus prevents the inadvertent lowering of the standard. When in supporting position, the standard 7 abuts against the detent 5, the standard being then in such position that the center of gravity of the rear portion of the vehicle is to the rear of the supporting foot 11.

The rear portion of the plate 1 is provided with an upward extension 13 having a perforation 14 through which the axle 15 of the bicycle is permitted to pass. The stand is thus secured to the vehicle by means of the clamping plate 3 secured around the frame member 2 and the axle 15 extending through the perforation 14.

Having thus fully described my invention, what I claim as new and desire to secure by Letters Patent is:

A stand for bicycles comprising a plate, means for securing the front portion of said plate to a horizontal frame member of a bicycle, said plate being provided with a perforation in the rear portion thereof whereby it may be secured to the rear axle of said bicycle, a standard pivotally mounted on said plate, a detent formed by bending outwardly the lower portion of said plate slightly in front of said pivotal mounting, a boss on said plate back of and slightly lower than said pivotal mounting, and a spring mounted on said pivotal mounting and arranged to maintain frictional contact between said standard and said plate.

EWALD F. PAWSAT.